United States Patent
Reddy et al.

(10) Patent No.: US 9,369,491 B2
(45) Date of Patent: Jun. 14, 2016

(54) INSPECTION OF DATA CHANNELS AND RECORDING OF MEDIA STREAMS

(71) Applicant: Cisco Technology, Inc., San Jose, CA (US)

(72) Inventors: Tirumaleswar Reddy, Bangalore (IN); Daniel Wing, San Jose, CA (US); Prashanth Patil, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 14/537,336

(22) Filed: Nov. 10, 2014

(65) Prior Publication Data

US 2016/0134659 A1    May 12, 2016

(51) Int. Cl.
*G06F 17/00* (2006.01)
*H04L 29/06* (2006.01)

(52) U.S. Cl.
CPC ............ *H04L 63/20* (2013.01); *H04L 63/1408* (2013.01)

(58) Field of Classification Search
CPC ... G06F 1/00; G06F 2101/00; G06F 21/6218; G06F 21/604; H04L 63/20; H04L 63/102; H04L 63/0227
USPC .......................................................... 726/1
See application file for complete search history.

(56) References Cited

U.S. PATENT DOCUMENTS

| 8,205,240 B2 * | 6/2012 | Ansari | G06Q 30/04 709/225 |
| 8,707,419 B2 * | 4/2014 | Kurapati | H04L 63/1458 726/13 |
| 2007/0101129 A1 * | 5/2007 | Wong | H04L 63/0846 713/160 |
| 2008/0072035 A1 * | 3/2008 | Johnson | H04L 63/0428 713/153 |
| 2011/0317834 A1 * | 12/2011 | Chaturvedi | H04L 63/061 380/255 |
| 2014/0317405 A1 * | 10/2014 | Johnson | H04L 63/0227 713/164 |
| 2015/0304427 A1 * | 10/2015 | Ortacdag | H04L 61/256 713/160 |

OTHER PUBLICATIONS

Jesup et al., RTCWeb Data Channels, Jul. 15, 2013, Internet Engineering Task Force.
Jesup et al., RTCWeb Datagram Connection, Mar. 6, 2012, Internet Engineering Task Force.
McGrew, Datagram Transport Layer Security (DTLS) Extension to Establish Keys for the Secure Real-Time Transport Protocol (SRTP), May 2010, Internet Engineering Task Force.
Paril et al., Turn Server Auto Discovery, Jul. 24, 2014, Internet Engineering Task Force.

(Continued)

*Primary Examiner* — Amare F Tabor
(74) *Attorney, Agent, or Firm* — Lempia Summerfield Katz LLC (57) ABSTRACT

In one implementation, two or more endpoints or client devices communication uses a peer-to-peer, browser based, real time communication protocol. One example of such a protocol is Web Real-Time Communication (WebRTC). An intermediary device receives from a first endpoint, a request for communication with a second endpoint, using the browser based real time communication. The intermediary device identifies a control protocol based on the request for communication, and receives one or more write keys from the first endpoint. The intermediary device monitors communication between the first endpoint and the second endpoint using the one or more write keys. Examples for the intermediary devices include servers, firewalls, and other network devices.

16 Claims, 7 Drawing Sheets

(56) References Cited

OTHER PUBLICATIONS

Rosenberg, Interactive Connectivity Establishment (ICE): A Protocol for Network Address Translator (NAT) Traversal for Offer/Answer Protocols, Apr. 2010, Internet Engineering Task Force.
Tuexen et al., Datagram Transport Layer Security (DTLS), Jan. 2011, Internet Engineering Task Force.
U.S. Appl. No. 14/194,348, filed Feb. 28, 2014.
Wasserman et al., Port Control Protocol (PCP) Authentication Mechanism, Feb. 7, 2014, Internet Engineering Task Force.
Wasserman et al., Port Control Protocol (PCP) Authentication Mechanism, Oct. 13, 2014, Internet Engineering Task Force.
Wing et al., PCP Extension for Third Party Authorization, Feb. 5, 2014, Internet Engineering Task Force.

* cited by examiner

INSPECTION OF DATA CHANNELS AND RECORDING OF MEDIA STREAMS

TECHNICAL FIELD

This disclosure relates in general to the field of inspection of data channels and recording of media streams, and more particularly inspection of data channels in peer to peer real time communication.

BACKGROUND

A variety of protocols are available for Internet communication and collaboration between users that are remotely located from each other. Some protocols establish a session or a connection with each other through signaling and subsequent transmission of media streams and data streams having different types of media content in a peer-to-peer session, or in a conference with multiple (or more than two) parties.

One example is Web Real-Time Communication (WebRTC). WebRTC provides direct, interactive, real-time communication using audio, video, collaboration, games, data files sharing and transfer, etc., between web browsers of two or more parties. However, because of the browser to browser nature of WebRTC, conventional third party security applications (e.g., at the firewall level or at the cloud level) are ineffective. The security applications may not be able to protect against malware, enforce security policies, or record user data when browser to browser communication or file transfer is used.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a server receives, from a first endpoint, a request for communication with a second endpoint, using browser based real time communication, and identifies, using a processor, a control protocol based on the request for communication. The server receives one or more write keys from the first endpoint and monitors, using the processor, communication between the first endpoint and the second endpoint using the one or more write keys.

In another embodiment, an endpoint includes a processor and a memory storing instructions that when executed are configured to cause the processer to: generate a communication initiation message from a first endpoint to a second endpoint, using browser based real time communication, receive, from an intermediary device, a request to advertise write keys in response to the communication initiation message, send one or more write keys in response to the request to advertise write keys and send communication to a second endpoint, wherein the communication is checked under a security policy by the intermediary device using the one or more write keys.

Example Embodiments

The Web Real Time Communication (WebRTC) framework provides the protocol building blocks to support direct, interactive, real time communication using audio, video, collaboration, games, and other applications between peer web browsers. WebRTC endpoints can exchange both media and generic data. The media may be delivered using real time transport protocol (RTP). The data channel may be established for non-media data types, for example, to download files. In the WebRTC context, stream control transmission protocol (SCTP) over datagram transport layer security (DTLS) over user datagram protocol (UDP) may be used for file transfers and DTLS-SRTP is used for the media streams.

WebRTC is an example of a browser based and peer to peer communication technique. WebRTC is an alternative to third-party plugins for a browser or other proprietary software. WebRTC may be implemented using a simple script or application programming interfaces (APIs), which may be implemented using an object oriented programming language (e.g., Java). Example APIs include MediaStream for the acquisition of video and/or audio streams, RTCPeerConnection for communication of video and/or audio data, and RTCDataChannel for communication of arbitrary application data.

While greatly simplifying peer to peer communication, WebRTC introduces other complications. The endpoints that run the peer browsers are often located on private networks behind one or more network address translation (NAT) devices. Neither endpoint is directly addressable by the other endpoint. The endpoint devices communicate using encrypted datagrams (e.g., as specified by DTLS). Therefore, a firewall device unaware of the encryption cannot inspect the encrypted datagrams for malicious content such as malware, bot commands, or viruses.

In addition, some enterprise networks may have a security policy or audit policy that specified that all media streams be recorded. Example networks that require recordings may be the banking and financial industries or government agencies. The network device that makes the recording may be unaware of the encryption used with browser based peer to peer communication. Thus, the network device is unable to make the recording in any usable fashion to comply with the policy.

The following embodiments describe systems and methods to distribute the client and server write keys used in browser based and peer to peer communication to trusted intermediary devices. Through distributed write keys, the trusted devices may enforce polices and protect the endpoints and networks from malicious software and data leakage.

Figure 1:
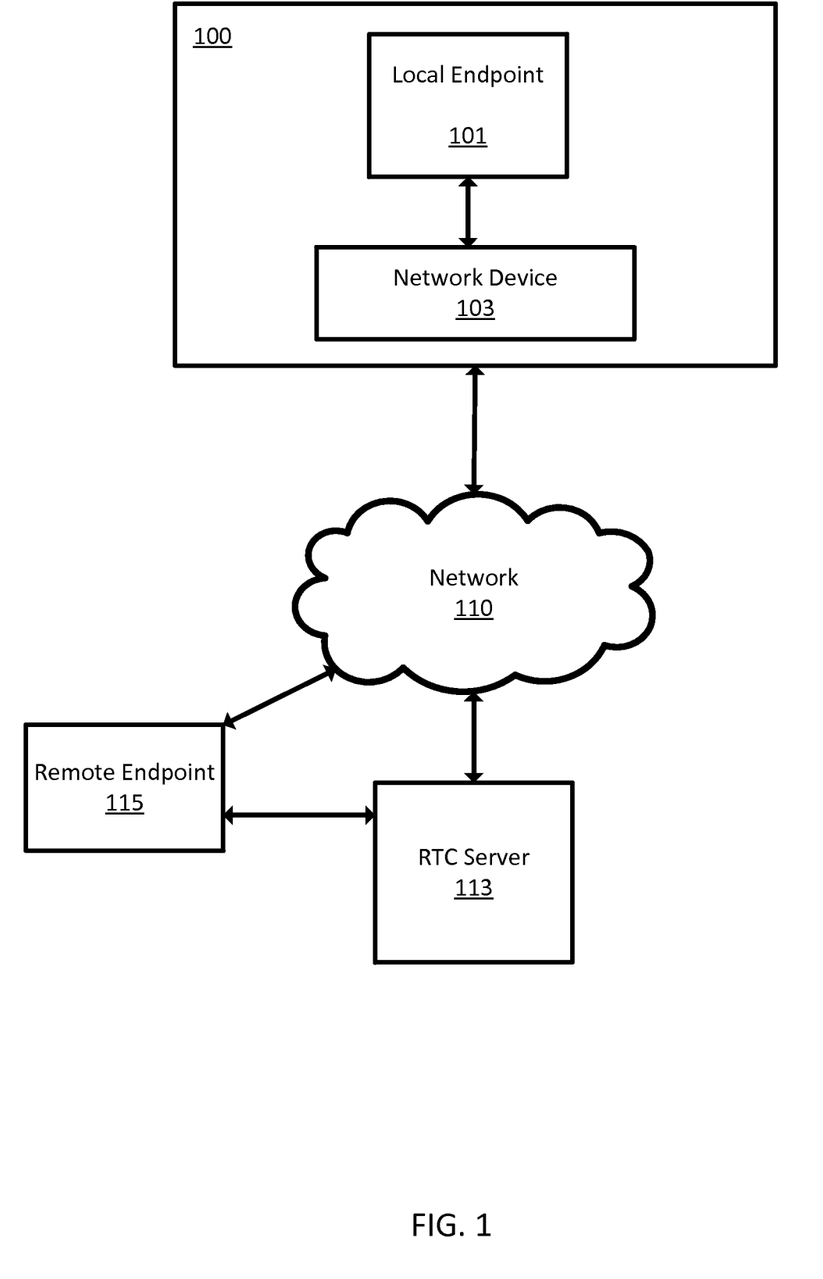
FIG. 1 illustrates an example system for inspection of real time peer to peer communication.

FIG. 1 illustrates example system for inspection of real time peer to peer communication. A local network 100 includes a local endpoint device 101 and a network device 103, which is in communication and coupled with an external network 110 (e.g., Internet). The external network 110 provides communication with a remote endpoint device 115. More endpoint devices may be included, and any of the endpoint devices may be personal computers, mobile devices, set top boxes, tablet computers, or any computing device configured for network communication. The network device 103 may be a server, a router, a gateway, or another network device. Additional, different, or fewer components may be included.

The local endpoint device 101 may initiate a real time communication (RTC) communication session included peer to peer (e.g., browser to browser) using an RTC protocol (e.g., WebRTC) through the RTC server 113. The local endpoint device 101 may generate a request for communication with the remote endpoint device 115 using the RTC protocol. The network device 103 receives the request for communication from the local endpoint device 101.

The network device 103 may also identify a control protocol in response to receiving the request for communication. The control protocol may be configured to control how incoming packets are forwarded by upstream devices. For example, the control protocol may instruct NAT devices or firewall devices in forwarded packets. The control protocol may also instruct packets around a NAT using a relay. The control protocol may be specified in the request for communication. Alternatively, the control protocol may be specified in a policy set for the local endpoint device 101. Example control protocols include port control protocol (PCP) and traversal around relays using network address translation (TURN). The network device 103 may generate a key request for the local endpoint device 101 and send the key request to the local endpoint device 101.

The local endpoint device 101 receives the key request and accesses one or more write keys in response to the key request. The write keys describe one or more encryption keys or encryption techniques for encrypting the payload. The write keys are used to decrypt and check the authenticity of packets. The write keys may be specified under DTLS. For example, the write keys may be generated as part of a DTLS handshake or Key Derivation mechanism as described in Section 4.2 of the RFC 5764 available at the IETF website and published May 2010.

The write keys are secret keys known only to the endpoints (e.g., local endpoint device 101 and remote endpoint device 115). The local endpoint device 101 uses a client write key to decrypt a media stream. The remote endpoint device 115 uses the client write key to decrypt the media stream. Similarly, the remote endpoint device 115 uses a server write key to encrypt the media stream, and the client endpoint device 101 uses the server write key to decrypt the media stream.

The local endpoint device 101 may determine whether the network device 103 is a trusted intermediary. A credential may have been previously exchanged between the local endpoint device 101 and the network device 103. The local endpoint device 101 sends the write keys to the network device 103.

In one example, the local endpoint device 101 may determine whether the network device 103 is a trusted intermediary. A credential may have been previously exchanged between the local endpoint device 101 and the network device 103. The local endpoint device 101 sends the write keys to the network device 103 in response to confirmation that the network device 101 is a trusted intermediary.

The network device 101 receives the one or more write keys from the local endpoint device 101 and decrypts communications between the local endpoint device 101 and the remote endpoint device 115 using the write keys. The network device 101 monitors the communication. The network device 101 may enforce a security policy on the communication between the first endpoint and the second endpoint. In one example, the network device 101 identifies and/or removes malicious packets or malicious software included in the communications. In another example, the network device 101 duplicates the communications (e.g., recording or forwarding all or a subset of data packets). Additional features and alternatives are described in the following embodiments.

Figure 2:
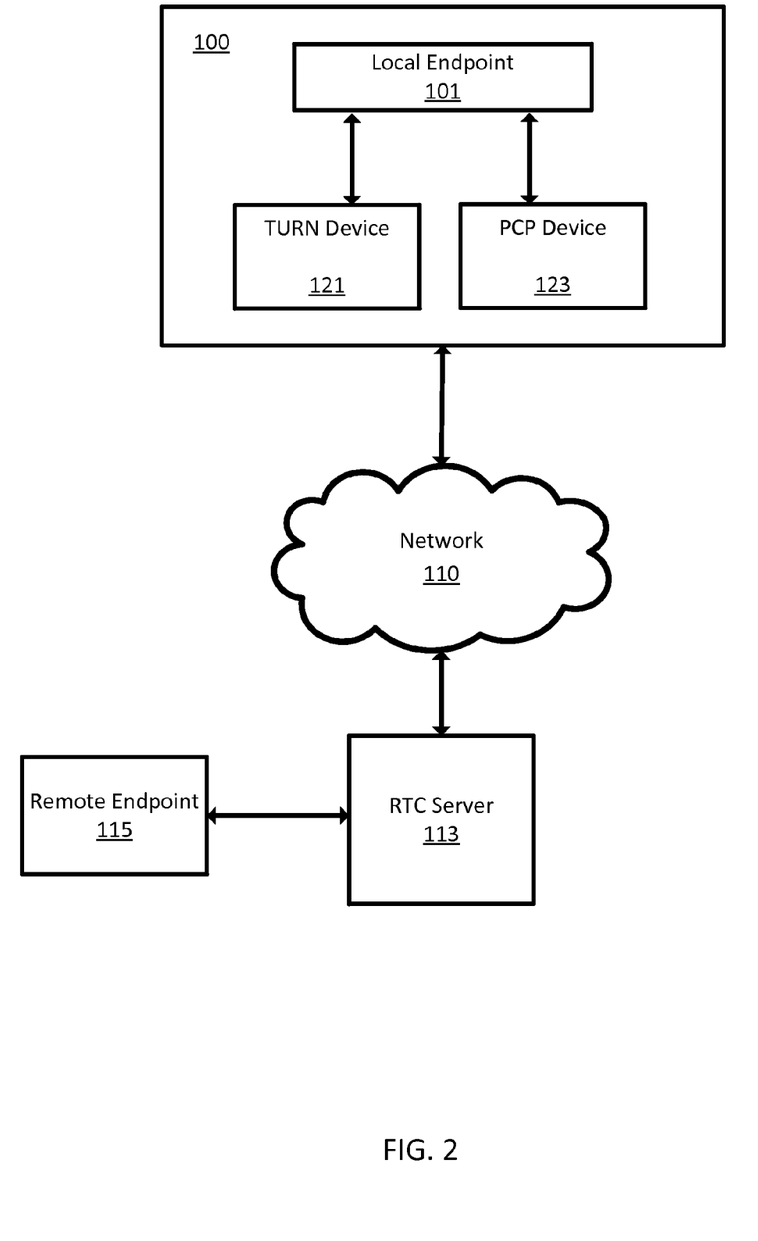
FIG. 2 illustrates another example system for inspection of real time peer to peer communication.

FIG. 2 illustrates another example system for inspection of real time peer to peer communication. A local network 100 includes a local endpoint device 101, a TURN device 121, and a PCP device 123 (e.g., PCP aware NAT and/or firewall), which are in communication and coupled with an external network 110 (e.g., Internet). The external network 110 provides communication with a remote endpoint device 115 through real time communication (RTC) server 113. The RTC server 113 may route packets between the remote endpoint 115 and the local network 100. Additional, different, or fewer devices may be included in the system.

The TURN device 121 may be a TURN server. When the local endpoint 101 attempts to contact the remote endpoint 115, the local endpoint first sends an allocate request to the TURN device 121 to request that the TURN device 121 to allocate resources for the communication. If resources are available the TURN device 121 sets aside an address for the TURN device 121 and returns a successful message to the local endpoint 101 including the relayed transport address.

The local endpoint 101 sends a CreatePermissions request to the TURN device 121 to create a permissions check system for communication with the remote endpoint 115. When the remote endpoint 115 is contacted, the remote endpoint 115 sends information back to the TURN device 115 to be relayed to local endpoint 101, and the TURN device 121 queries stored permissions to verify that the communication is valid.

After permissions have been created, the local endpoint 101 has two choices of sending the actual data. The data may be sent using a send mechanism, or the data may be sent by reserving a channel by the ChannelBind request. The send mechanism and the ChannelBind requests are packets. The send mechanism has a larger header than the ChannelBind request and may require more bandwidth than the ChannelBind request.

One communication is established using either technique, the TURN device 121 receives data from local endpoint 101 and relays it to remote endpoint 115 using UDP datagrams. The datagrams list a source address as the allocated relayed transport address. The remote endpoint 115 receives the data and responds using a UDP datagram as the transport protocol, sending the UDP datagram to the relay address at the TURN device 121. The TURN device 121 receives the UDP datagram, checks permissions and if the permissions are valid, forwards the UDP datagram to the local endpoint 101.

The PCP device 123 may be a firewall device or a firewall server. The PCP device 123 may exchange control messages with the local endpoint 101 with UDP as an underlying protocol. The control messages may include MAP messages, PEER messages, and ANNOUNCE messages. The MAP messages may be port mapping requests that create or renew a mapping for inbound communications. The PEER messages may be port mapping requests that create or renew a mapping for outbound communications. The ANNOUNCE messages may describe changes in servers or server restarts.

Figure 3:
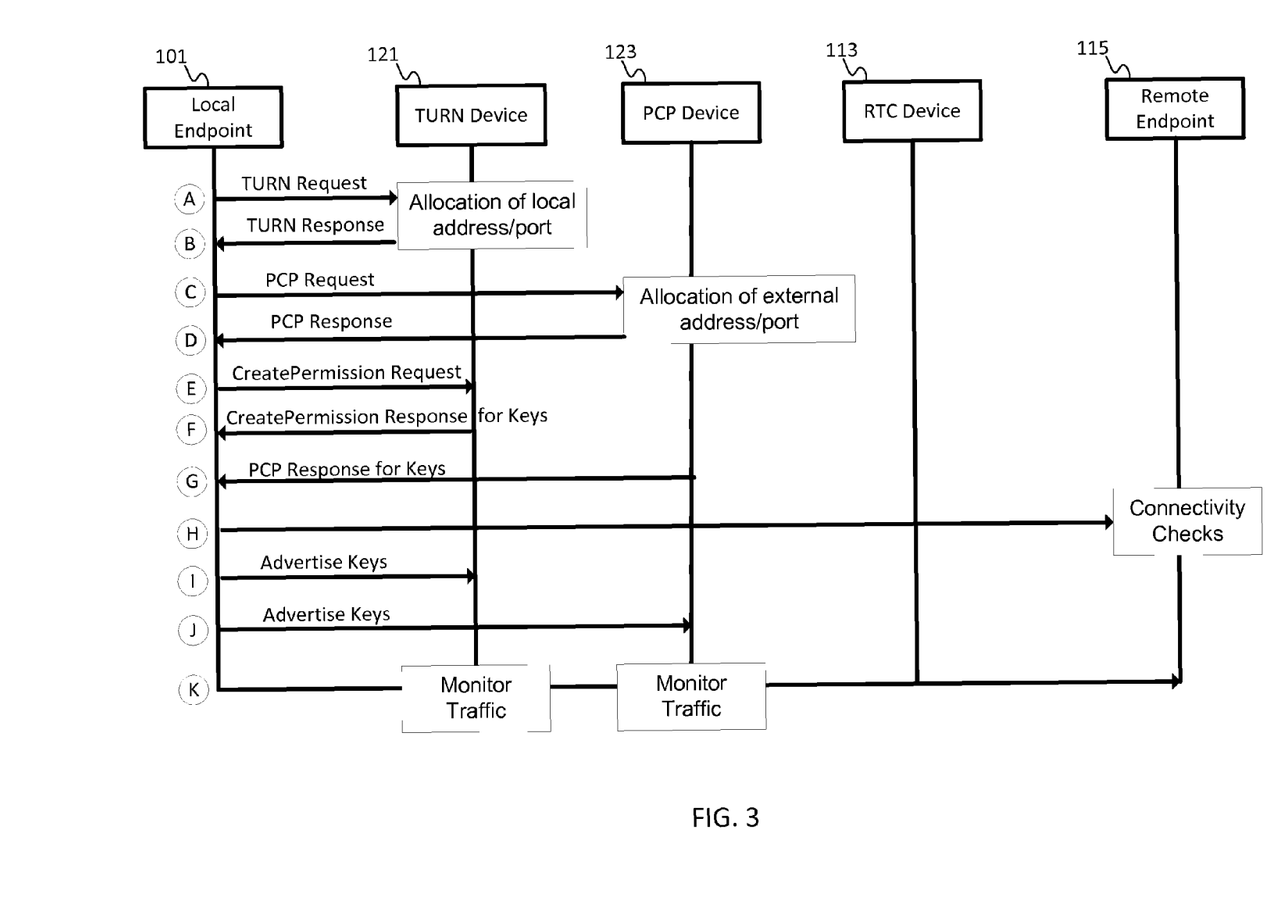
FIG. 3 illustrates an example of a timing chart for the systems of FIGS. 1 and 2.

FIG. 3 illustrates an example of a timing chart for the systems of FIGS. 1 and 2. Communications between the local endpoint 101, the TURN device 121, the PCP device 123, the RTC device 113, and the remote endpoint 115 are shown. Additional, different, or fewer communications may be used. For example, communication may be initially established and address mapping defined according to message exchanges for TURN or PCP described above.

The TURN device 121 and the PCP device 123 are packet control devices. The TURN device 121 relays messages for the peer to peer RTC communication. The TURN device 121 may create two communication legs. One leg connects the TURN device 121 to the local endpoint 101, and the other leg connects the TURN device 121 to the remote endpoint 115. The PCP device controls how messages are forwarded by upstream devices such as NAT devices or firewall devices. In one embodiment, only the TURN device 121 is used for peer to peer RTC communication. In another embodiment, only the PCP device 123 is used for peer to peer RTC communication. In another embodiment, both the TURN device 121 and the PCP device 123 are used for peer to peer RTC communication.

The TURN device 121 may authenticate the local endpoint 101 using a long-term credential. The long-term credential may be a username and password. The long-term credential may be exchanges using the digest access authentication scheme.

In stage A, the local endpoint 101 sends a TURN request to the TURN device 121. The local endpoint 101 may be configured for Interactive Connectivity Establishment (ICE), referred to as an ICE agent. The ICE agent on the local endpoint 101 is configured to use the TURN protocol to learn relayed candidates. Relayed candidates are transport addresses on the TURN device 121. In response to the TURN request, the TURN device 121 allocates a port from its local IP address and reports the port and IP address in the TURN response at stage B. The network may include multiple TURN devices for load balancing or increased availability. At stages C and D, which may be performed in the alternative or in addition to stages A and B, the PCP device 123 allocate external addresses and ports or opens firewall pinholes. Firewall traversal problems for WebRTC may be solved using either PCP or TURN. Hence two alternative mechanisms are provided. For example, an Enterprise deployment may have both PCP and TURN servers. For example, for certain calls that client wants location privacy it can only use the TURN server for relaying the media streams and for other calls PCP server could be used.

The local endpoint 101 may send a PCP request to the PCP device 123. The PCP device 123 may return the PCP response to the local endpoint 101. The PCP response includes external IP address and ports. The external IP addresses and ports learned from PCP device 123 are advertised to the remote endpoint 115 as server-reflexive candidates. The PCP device 123 may authenticate the local device 101 using various techniques. In one technique, as defined by "draft-ietf-pcp-authentication-03" and available at the Internet Engineering Task Force (IETF) website as published Feb. 7, 2014. The PCP device 123 exchange authentication messages. In another technique, third party authentication, as defined by "draft-ietf-pcp-authentication-06" and available at the Internet Engineering Task Force (IETF) website as published Oct. 13, 2014, permits authorized flows across a PCP-aware firewall. Other examples may be used. The PCP device 123 may become aware of assignments of pin-holes for data channels, audio streams, video streams, or other streams.

At Stage E, the local endpoint 101 (TURN client) sends CreatePermission request to the TURN device or server 121 to install permissions to exchange traffic with endpoint 115. The local endpoint 101 may discover the TURN device 121 according to a discovery algorithm for example as described by "draft-ietf-tram-turn-server-discovery-00" available at the IETF website and published Jul. 24, 2014. Earlier or later versions of the discovery algorithm may be used.

At stage F, the TURN device 121 in the CreatePermission success response includes a new session traversal utilities for NAT (STUN) attribute signaling the local endpoint 101 to provide write keys for decrypting data channels and media streams. The CreatePermission success response may specify a session associate with the write keys. At state G, the PCP device 123 may generate an unsolicited PCP response to the local endpoint 101. The PCP response may include a new PCP option that requests that the local endpoint 101 send one or more write keys for decrypting data channels and/or media streams to the PCP device 123. The write keys may be generated as part of a DTLS handshake as described in RFC 5764 available at the IETF website and published May 2010. Other types of write keys may be used.

The PCP request may include one or more unsolicited PCP messages such as a MAP response or a PEER response. The PCP messages may include a new PCP option instructing the local endpoint 101 to convey the one or more write keys.

Figure 4:
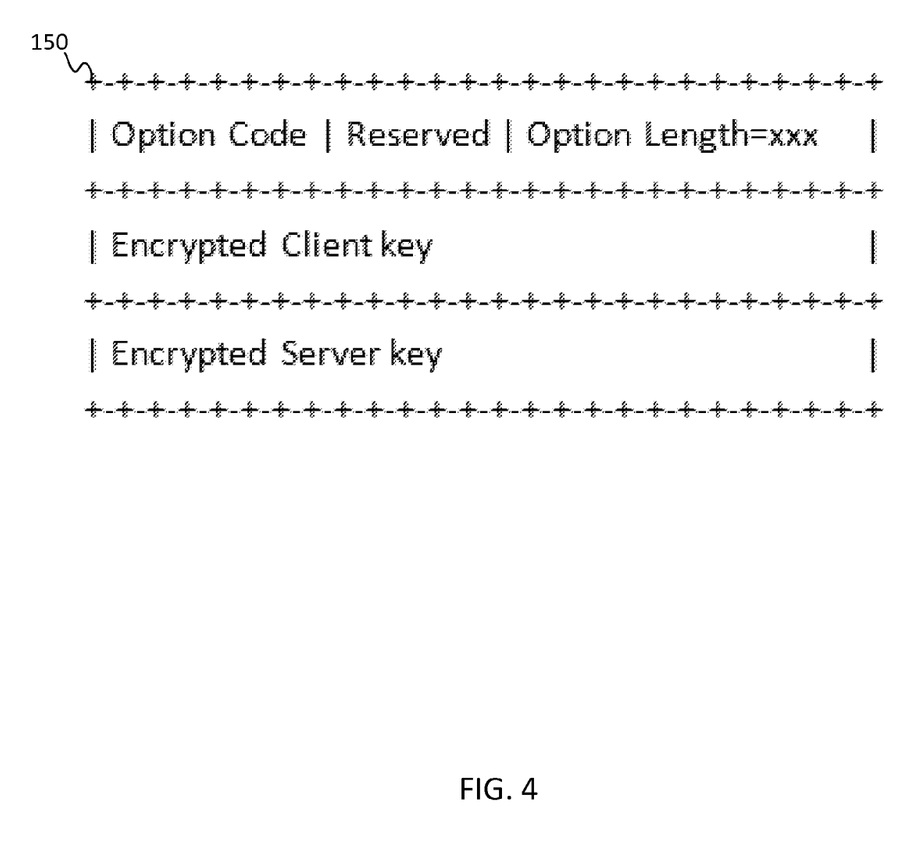
FIG. 4 illustrates an example option for a write key request.

FIG. 4 illustrates an example PCP option 150 for a write key request. The PCP option includes an encrypted client key and an encrypted server key. The client key is the key for encrypting communications sent from the local endpoint 101 to the remote endpoint 115. The server key is the key for encrypting communications received from the remote endpoint 115 to the local endpoint 101. The local endpoint 101 and the remote endpoint generate client and server write keys using DTLS handshake as discussed in RFC 5764 and available on the IETF website, for example, as published in May 2010. The local endpoint 101 may be configured with the certificates of the devices it will share its session keys with. The local endpoint may be configured with the Enterprise CA root certificate that identified the root certificate authority.

Referring back to FIG. 3, at stage H, the local endpoint 101 and the remote endpoint 115 perform connectivity checks. The connectivity checks may be ICE connectivity checks according to RFC 5245 as published by the IETF website, for example, the version published April 2010. Previous or subsequent versions may be used. The connectivity checks may determine if any of the local relayed candidates or reflexive candidates will be nominated for media and data channels. The local endpoint 101 may include a table that associates addresses with control protocols (e.g., either PCP or TURN). The connectivity check determine whether the local endpoint 101 is using PCP, TURN, or both.

Either of stages I and J may be omitted. In states I and J, the local endpoint 101 advertises the write keys. The local endpoint may send write keys to the either intermediary device. In stage I, the local endpoint 101 sends one or more write keys to the TURN device 121. In stage J, the local endpoint 101 sends one or more write keys to the PCP device 123. The write keys may be DTLS write keys. In one example, the local endpoint uses both PCP and TURN such that media is routed through the TURN device 121 and file transfer is routed through the PCP device 123.

In one example, the local endpoint 101 is not using local relayed candidates for both media and data channels, then the local endpoint 101 only advertises the write keys to the PCP device 123. The write keys may be encrypted using a transport key derived from PCP authentication and sent to the PCP server within a new option in the PCP PEER request.

In one example, the local endpoint 101 may use local relayed candidates for both media and data channels. The local endpoint 101 advertises the DTLS client and server write keys to the TURN server. The client/server write keys will be encrypted using the key derived for long-term authentication and sent to the TURN sever within a new STUN attribute in the ChannelBind Request.

In one example, the local endpoint 101 may use both local relayed and server-reflexive candidates for media and data streams. The local endpoint 101 advertises the DTLS client and server keys to both TURN device 121 and the PCP device 123.

At stage K, either or both of the trusted intermediaries (e.g., TURN device 121 and the PCP device 123) monitor communications between the local endpoint 101 and the remote endpoint 115. The intermediary devices may enforce relevant security and/or auditing policies for the media and data channels.

The PCP device 123 may use DTLS for confidentiality so that no unauthorized device can intercept the write keys. Similarly, the TURN device 121 may use transport layer security (TLS) or DTLS so that no unauthorized device can intercept the write keys. TLS and DTLS may provide confidentiality for PCP and TURN messages. Accordingly, any "man-in-the-middle" or other malicious devices cannot see or intercept the messages exchanged between the PCP device 123 or TURN device 121 and the local endpoint 101 or remote endpoint 115. No brute force techniques are available to malicious devices to derive the encrypted write keys.

The local endpoint 101 may perform a re-negotiation of DTLS with the remote endpoint 115. The re-negotiation may be a DTLS handshake (e.g., under RFC 5764 described above or under RFC 6347 published January 2012). The re-negotiation may occur for the media channel, data channel, or both. Thus, new write keys may be established. When the re-negotiation occurs, the local endpoint 101 may notify the intermediary devices, PCP device 123 and/or the TURN device 121, with the new write keys. If the local endpoint 101 does not notify the corresponding intermediary device, the intermediary device may determine that the re-negotiation has taken place through monitoring traffic. Thus, PCP device 123 and/or the TURN device 121 may be configured to identify a subsequent negotiation between the local endpoint 101 and the remote endpoint 115 and determine whether one or more write keys have been received that correspond to the subsequent negotiation. Accordingly, the intermediary device may drop the session or block communications if the new write keys have not been supplied.

Figure 5:
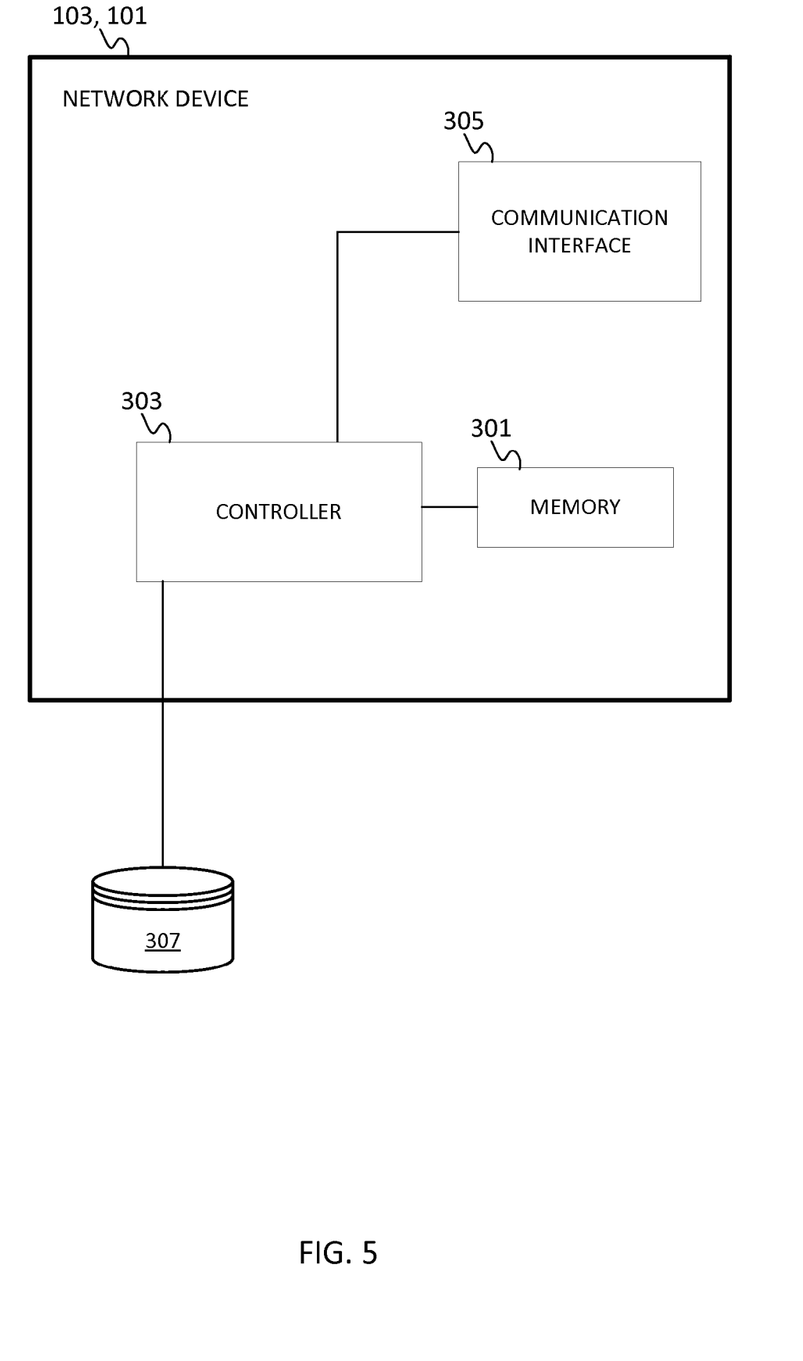
FIG. 5 illustrates an example network device for the systems of FIG. 1 or 2.

FIG. 5 illustrates an example network device 103 for the networks of FIG. 1 of FIG. 2. The network device 103 includes at least a memory 301, a controller 303, and a communication interface 305. In one example, a database 307 stores write keys. Additional, different, or fewer components may be provided. Different network devices may have the same or different arrangement of components.

Figure 6:
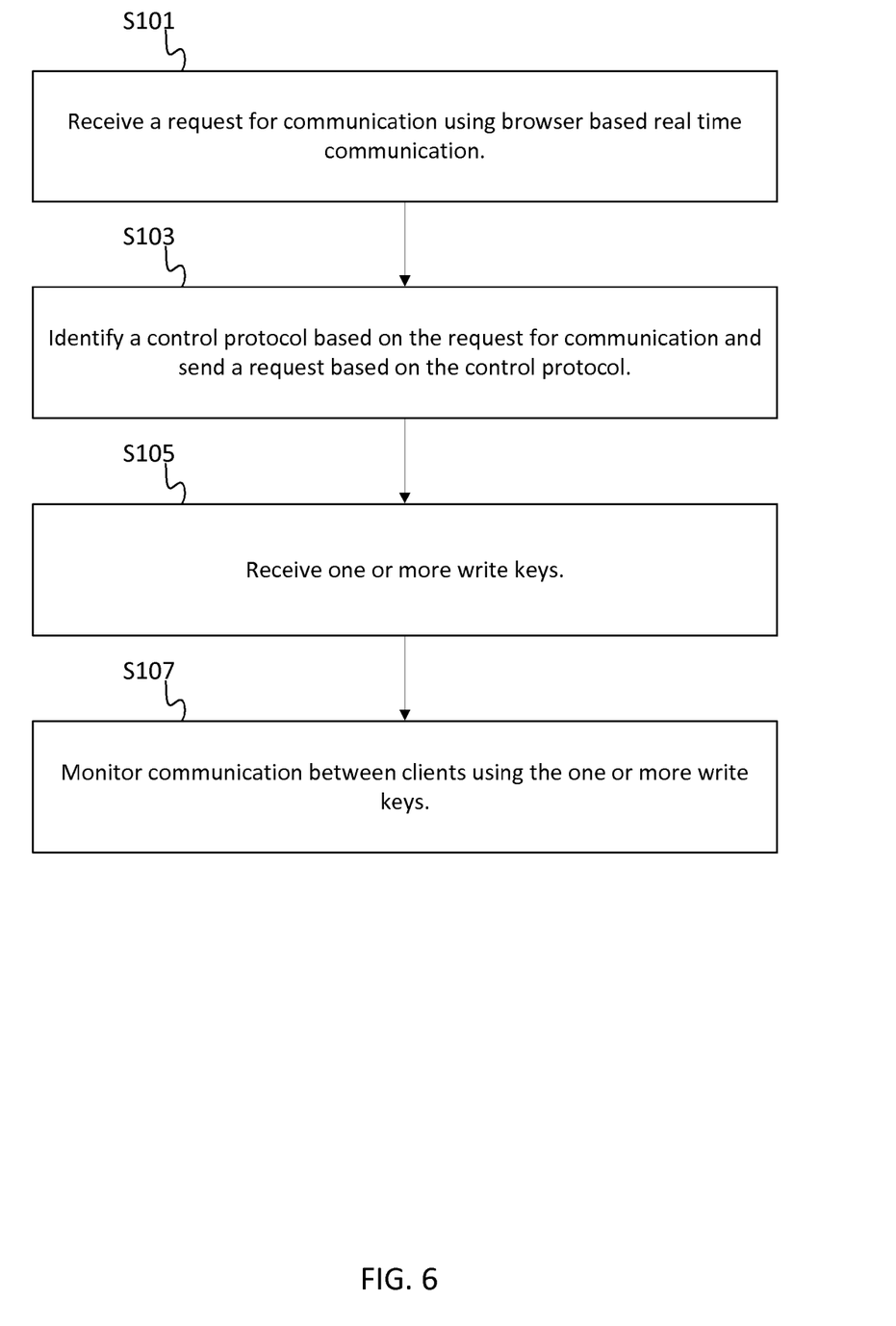
FIG. 6 illustrates an example flowchart for inspection of real time peer to peer communication with the network device of FIG. 1.

FIG. 6 illustrates an example flowchart for the network device 103. Additional, different, or fewer acts may be provided. The acts are performed in the order shown or other orders. The acts may also be repeated.

At act S101, the communication interface 305 or the controller 303 receives a request for communication from a first client to communicate with a second client. The request for communication may specify browser based real time communication (e.g., WebRTC). The browser based real time communication may be implemented using an API. The API may be configured for a variety of commands including a get user media command that enables the web browser to access a media device (e.g., camera and/or microphone), a peer connection command that sets up calls (e.g., audio, video, or both), and a data channel command that allows the clients to exchange data directly peer-to-peer between browsers.

At act S103, the controller 303 identifies a control protocol (e.g., a mapping protocol or relay protocol) from the request for communication. The request may include a protocol identifier field and a predetermined number of bits in a header of the request. Examples for the mapping or relay protocol may be PCP or TURN.

At act S105, the controller 303 or communication interface 305 receives one or more write keys from the first client. The write keys may be DTLS keys for communication to and from the first client. The write keys may include an encryption key for deciphering data sent from the first client. The write keys may include a first write key for a media channel and a second write key for a data channel.

The controller 303 may also start a timer in response to act S103. The controller may block communication between the first client and the second client if the one or more write keys from the first endpoint are not received before the timer reaches a predetermined time period. Example predetermined time periods include 10 seconds, 1 minute, or 10 minutes. Other values are possible. Alternatively, the controller 303 may block communication between the first client and the second client if the first endpoint affirmatively declines (e.g., rejection message) sending the one or more write keys.

At act S107, the controller 303 monitors communication between the first client and the second client using the one or more write keys. The controller 303 may record data between the clients. The controller 303 may filter data between the clients according to a content filter or a data quota. The content filter may remove types of data such as adult content or data related to national security. The data quota may remove all data, or all non-vital data, transmitted between the clients when the first client has reached a data quota over a predetermined time (e.g., the current day, week or month). Vital data may be defined by a list of IP addresses associated with priority communication. Non-vital data may be data to and from IP addresses not on the list. The controller 303 may inspect the data between the clients for malicious software.

Figure 7:
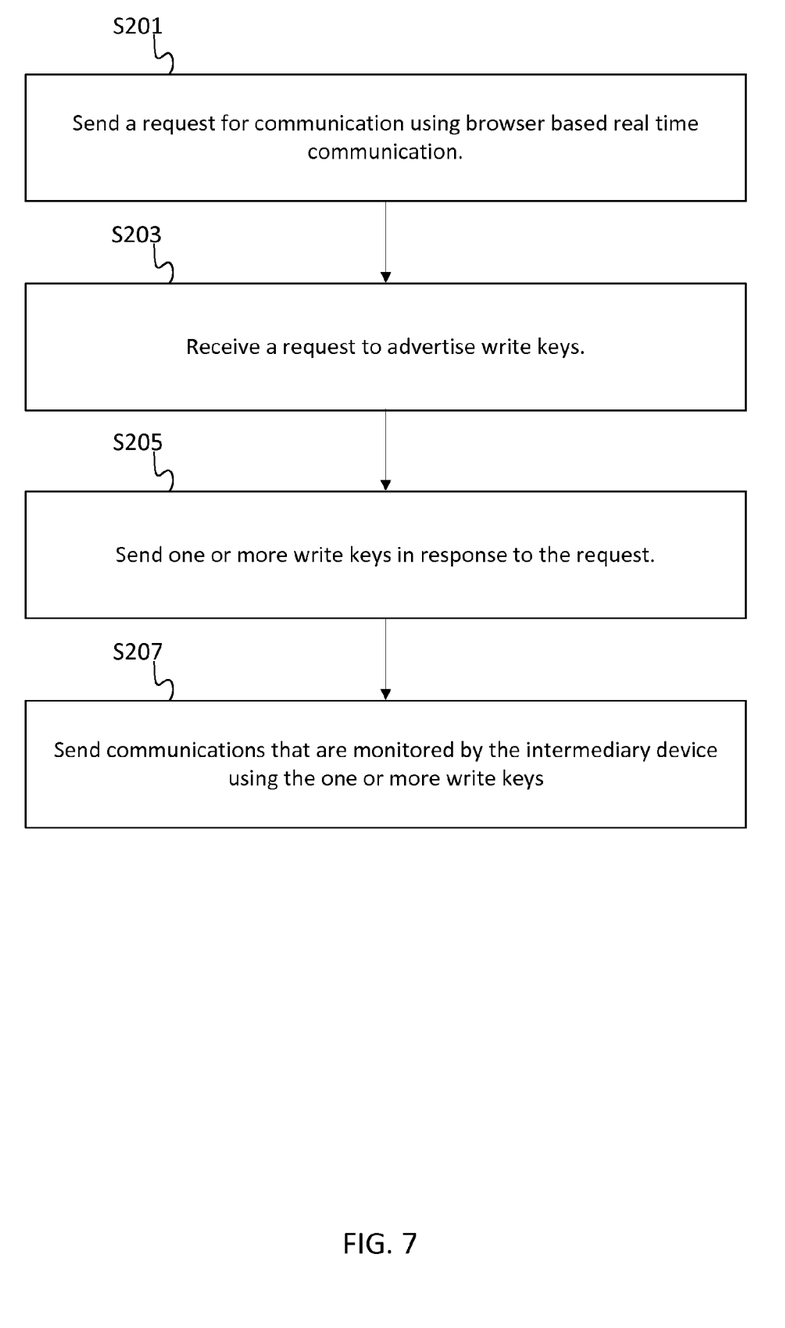
FIG. 7 illustrates an example flowchart for inspection of real time peer to peer communication with the endpoint of FIG. 1.

In another example, FIG. 5 illustrates an example local endpoint 101 for the networks of FIG. 1 of FIG. 2. The local endpoint 101 includes at least a memory 301, a controller 303, and a communication interface 305. FIG. 7 illustrates an example flowchart for the local endpoint 101. Additional, different, or fewer acts may be provided. The acts are performed in the order shown or other orders. The acts may also be repeated.

At act S201, the controller 303 or the communication interface 305 send a communication initiation message to initiate communication with another endpoint using browser based real time communication.

At act S203, the controller 303 or the communication interface 305 receives a request to advertise write keys from an intermediary device in response to the communication initiation message. The request may specify DTLS client and server keys. At act S205, the controller 303 or the communication interface 305 sends one or more write keys in response to the request. The controller 303 may generate a permission request that is displayed to the user. The permission request may request may list the intermediary device (e.g., by IP address or by a name specified in the request) and ask whether the user approves sending the write keys to the intermediary device.

At act S207, the controller 303 or the communication interface 305 sends communications to a second endpoint by way of the intermediary device. The intermediary device may monitor the communications using the one or more write keys. The intermediary device may perform any of the security policies described herein.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memory 301 is a non-transitory computer-readable medium, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising: receiving, from a first endpoint, a request for communication with a second endpoint, using browser based real time communication;
   identifying, using a processor, a control protocol based on the request for communication;
   receiving one or more write keys from the first endpoint;
   monitoring, using the processor, communication between the first endpoint and the second endpoint using the one or more write keys;
   generating a key request listing the control protocol;
   sending the key request to the first endpoint; and
   starting a timer in response to the key request, wherein the communication between the first endpoint and the second endpoint is blocked if the one or more write keys from the first endpoint are not received before the timer reaches a predetermined time period or if the key request is declined.

2. The method of claim 1, further comprising:
   enforcing a security policy on the communication between the first endpoint and the second endpoint.

3. The method of claim 2, wherein the security policy includes the identification or removal of malicious packets or malicious software.

4. The method of claim 2, wherein the security policy includes recording or forwarding the communication between the first endpoint and the second endpoint.

5. The method of claim 2, wherein the security policy includes filtering data based on the type of data or content of the communication between the first endpoint and the second endpoint.

6. The method of claim 1, wherein the control protocol is port control protocol (PCP) and the key request is included in a PCP option of a MAP or PEER response.

7. The method of claim 1, wherein the control protocol is a traversal around relays using network address translation (TURN) protocol and the key request is included in a session traversal utilities for network address translation (STUN) attribute of a permission response.

8. The method of claim 1, further comprising:
   starting a timer in response to the key request, wherein the communication between the first endpoint and the second endpoint is blocked if the one or more write keys from the first endpoint are not received before the timer reaches a predetermined time period or if the key request is declined.

9. The method of claim 1, wherein receiving one or more write keys from the first endpoint further comprises:
   receiving a first write key for a media channel; and
   receiving a second write key for a data channel.

10. An apparatus comprising: a communication interface configured to receive, from a first endpoint, a request for communication with a second endpoint, using browser based real time communication; and a processor configured to identify a control protocol based on the request for communication and monitor communication between the first endpoint and the second endpoint using one or more write keys received from the first endpoint,     wherein the processor is configured to generate a key request for the first endpoint and the key request lists the control protocol,     wherein the processor is configured to start a timer in response to the key request, wherein the communication between the first endpoint and the second endpoint is blocked if the one or more write keys from the first endpoint are not received before the timer reaches a predetermined time period or if the key request is declined.

11. The apparatus of claim 10, wherein the processor is configured to enforce a security policy on the communication between the first endpoint and the second endpoint.

12. The apparatus of claim 11, wherein the security policy requires portions of the communication between the first endpoint and the second endpoint to be recorded.

13. The apparatus of claim 11, wherein the security policy includes the identification or removal of malicious packets or malicious software.

14. The apparatus of claim 11, wherein the security policy includes filtering data based on the type of data or content of the communication between the first endpoint and the second endpoint.

15. A method comprising: sending, from a first endpoint, a communication initiation message with a second endpoint, using browser based real time communication;

receiving, from an intermediary device, a request to advertise write keys in response to the communication initiation message;

sending one or more write keys in response to the request to advertise write keys; and     sending communications to a second endpoint, wherein the communications are monitored by the intermediary device using the one or more write keys,     wherein a timer is started in response to the request, wherein communication between the first endpoint and the second endpoint is blocked if the one or more write keys from the first endpoint are not received before the timer reaches a predetermined time period.

16. An apparatus comprising: a processor; and a memory storing instructions that when executed are configured to cause the processor to:

generate a communication initiation message from a first endpoint to a second endpoint, using browser based real time communication;

receive, from an intermediary device, a request to advertise write keys in response to the communication initiation message;

send one or more write keys in response to the request to advertise write keys; and     send communication to a second endpoint, wherein the communication is checked under a security policy by the intermediary device using the one or more write keys,     wherein a timer is started in response to the request,     wherein communication between the first endpoint and the second endpoint is blocked if the one or more write keys from the first endpoint are not received before the timer reaches a predetermined time period.

\* \* \* \* \*